US011505676B2

(12) United States Patent
Chen et al.

(10) Patent No.: US 11,505,676 B2
(45) Date of Patent: Nov. 22, 2022

(54) HANDLING ADDITIVE FOR SILICONE ELASTOMER BASES

(71) Applicant: DOW SILICONES CORPORATION, Midland, MI (US)

(72) Inventors: Yusheng Chen, Shanghai (CN); Shaohui Wang, Shanghai (CN); Rui Wang, Shanghai (CN); Mark D. Fisher, Midland, MI (US)

(73) Assignee: DOW SILICONES CORPORATION, Midland, MI (US)

( * ) Notice: Subject to any disclaimer, the term of this patent is extended or adjusted under 35 U.S.C. 154(b) by 397 days.

(21) Appl. No.: 16/634,828

(22) PCT Filed: Jul. 27, 2018

(86) PCT No.: PCT/CN2018/097412
§ 371 (c)(1),
(2) Date: Jan. 28, 2020

(87) PCT Pub. No.: WO2019/024779
PCT Pub. Date: Feb. 7, 2019

(65) Prior Publication Data
US 2021/0087360 A1 Mar. 25, 2021

(30) Foreign Application Priority Data
Jul. 31, 2017 (WO) ................ PCT/CN2017/095136

(51) Int. Cl.
*C08K 5/55* (2006.01)
*C08K 5/14* (2006.01)
*C08L 27/18* (2006.01)
*C08L 83/04* (2006.01)
*C08G 77/16* (2006.01)
*C08G 77/18* (2006.01)
*C08G 77/20* (2006.01)

(52) U.S. Cl.
CPC ................ *C08K 5/55* (2013.01); *C08G 77/16* (2013.01); *C08G 77/18* (2013.01); *C08G 77/20* (2013.01); *C08K 5/14* (2013.01); *C08L 27/18* (2013.01); *C08L 83/04* (2013.01); *C08L 2203/20* (2013.01)

(58) Field of Classification Search
CPC .. C08K 5/55; C08K 5/14; C08L 27/18; C08L 83/04; C08G 77/16; C08G 77/18; C08G 77/20
USPC ....................................................... 524/183
See application file for complete search history.

(56) References Cited

U.S. PATENT DOCUMENTS

| 2,721,857 | A | | 10/1955 | Dickmann | |
|---|---|---|---|---|---|
| 3,050,490 | A | * | 8/1962 | Wick et al. | C08K 3/38 524/404 |
| 3,070,560 | A | | 12/1962 | Metevia | |
| 3,772,240 | A | * | 11/1973 | Greenlee | C08K 3/38 528/901 |
| 4,252,709 | A | * | 2/1981 | Skostins | C08K 5/053 524/588 |
| 8,785,507 | B2 | * | 7/2014 | Bloomfield | C08K 3/38 521/154 |
| 2008/0138386 | A1 | | 6/2008 | Joffre et al. | |
| 2009/0258058 | A1 | | 10/2009 | Thomas et al. | |
| 2015/0045486 | A1 | | 2/2015 | Hortsman et al. | |
| 2016/0130405 | A1 | | 5/2016 | Thuresson et al. | |

FOREIGN PATENT DOCUMENTS

| CN | 101478973 A | 7/2009 |
|---|---|---|
| CN | 101921565 A | 12/2010 |
| CN | 103995437 A | 8/2014 |
| CN | 104053698 A | 9/2014 |
| CN | 105492501 A | 4/2016 |
| CN | 107022195 A | 8/2017 |
| JP | S59155483 A | 9/1984 |
| JP | 2000313806 A | 11/2000 |
| JP | 2008525598 A | 7/2008 |
| JP | 2014114375 A | 6/2014 |

OTHER PUBLICATIONS

International Search Report for PCT/CN2018/097412 dated Oct. 23, 2018, 3 pages.
Machine assisted English translation of JPS59155483 obtained from https://patents.google.com/patent on May 24, 2022, 3 pages; and from https://worldwide.espacenet.com on May 25, 2022, 6 pages.
Machine assisted English translation of CN103995437 obtained from https://patents.google.com/patent on May 24, 2022, 16 pages.
Machine assisted English translation of CN107022195 obtained from https://patents.google.com/patent on May 24, 2022, 11 pages.
Machine assisted English translation of CN101921565A obtained from https://patents.google.com/patent on May 24, 2022, 11 pages.
Machine assisted English translation of JP2000313806A obtained from https://patents.google.com/patent on Aug. 5, 2022, 6 pages.
Machine assisted English translation of JP2014114375A obtained from https://patents.google.com/patent on Aug. 5, 2022, 8 pages.

* cited by examiner

*Primary Examiner* — Deve V Hall
(74) *Attorney, Agent, or Firm* — Warner Norcross + Judd LLP

(57) ABSTRACT

A handling additive composition is disclosed. The composition is useful to improve handling of silicone elastomers prepared from polydiorganosiloxanes and silicone elastomers made therewith.

13 Claims, No Drawings

HANDLING ADDITIVE FOR SILICONE ELASTOMER BASES

CROSS-REFERENCE TO RELATED APPLICATIONS

This application is the National State of International Appl. No. PCT/CN2018/097412 filed on 27 Jul. 2018, which claims priority to and all advantages of International Patent Application No. PCT/CN2017/095136 filed on 31 Jul. 2017, the content of which is incorporated herein by reference.

The present invention relates to handling additives to improve the handling of silicone elastomer bases prepared from polydiorganosiloxanes and fillers, curable silicone elastomer stock compositions made therewith and silicone rubber elastomers which are manufactured therefrom.

Silicone elastomer bases commonly are produced from a polydiorganosiloxane of gum consistency and reinforcing fumed silica with optionally an anti-crepe aging material. Such bases may include many additional additives to modify the properties of the base, stock or the resulting cured silicone elastomer obtained therefrom. To achieve desirable physical or electrical properties, or even other functions, of the cured silicone elastomer, certain combinations of ingredients are used to prepare the composition of the silicone elastomer base and stock compositions. The bases and stock compositions may not have the most desirable handling properties, that is, they may be softer or tackier than is desired for easy handling or further processing in equipment such as two roll mills, extruders or calendars.

Curable silicone elastomer stock compositions are generally a combination of base thoroughly inter-mixed with a peroxide catalyst or a cure package comprising with organopolysiloxane having at least two, typically at least three S—H bonds per molecule. Such stock compositions may be cured to produce silicone elastomers which may be suitably shaped prior to cure.

Current handling additives include combinations of boric acid, polyhydroxy alcohol and filler, such as described in U.S. Pat. No. 4,252,709.

Boric acid (CAS 10043-35-3, MW 61.83 g/mol) is currently being reviewed in legislation requirements in view of potential toxicity or environmental concerns. Therefore, compositions requiring presence of boric acid may/will need to be reformulated.

In a constant effort to ensure safety for people and environment, the inventors have strived to find alternative solutions to handling additives containing boric acid.

The present invention thus relates to handling additives for silicone elastomer bases, based on boric acid derivatives selected from borinic acids and boronic acids. These derivatives not only improve the safety profile, but additionally improve the performance of the handling additive in providing for increased plasticity and reduction of stickiness.

The present handling additive composition comprises
   at least one boric acid derivative, selected from borinic acids, boronic acids and mixtures thereof;
   a silicone polymer; and
   an optional powder.

The present invention also relates to a modified silicone elastomer base composition comprising silicone elastomer base modified with the present handling additive, a silicone elastomer stock composition made by mixing said modified silicone elastomer base composition with a catalyst or curing package and articles made therefrom.

A method to provide said handling additive is also provided.

Last provided is the use of one or more boric acid derivatives selected from borinic acids, boronic acids and mixtures thereof in a handling additive composition for silicone elastomer base and/or stock composition.

Boric acid as described herein has the general formula $B(OH)_3$. For the avoidance of doubt, derivatives of the boric acid as will be hereafter discussed include those compounds where at least one boric acid (—OH) group is replaced by a hydrocarbon or organyl group.

The at least one boric acid derivative of the handling additive composition may typically be selected from borinic acids and/or boronic acids.

Boronic acid conforms to the formula $R—B(OH)_2$, where R may be an alkyl-, alkenyl-, alkynyl-, aryl- or organyl-group. Organyl groups include those hydrocarbon groups having at least one hetero-atom such as sulphur, nitrogen, phosphorus and/or halogen.

The reactivity and properties of boronic acids is highly dependent upon the nature of their single variable substituent; more specifically, by the type of carbon group (R) directly bonded to boron. In the same customary way as for other functional groups, boronic acids are classified conveniently in subtypes such as boronic acids.

Borinic acid conforms to the formula RR'BOH, where R and R' may each be independently an alkyl-, alkenyl-, alkynyl-, aryl- and/or organyl-group.

Examples of R and/or R' groups include methyl, phenyl, p-methoxyphenyl, 3,5-dichlorophenyl, 3,5-bis(trifluoromethyl)phenyl, 3-methoxyphenyl, 4-methoxyphenyl, 4-carboxyphenyl, 2-nitrophenyl, 4-nitrophenyl, 4-bromophenyl, 4-fluorophenyl, 2-methylphenyl, 3-methylphenyl, 4-methylphenyl, 3,5-dimethylphenyl, 3-methoxycarbonyl-5-nitrophenyl, 3-pyridyl, 8-quinolinyl, 2-($R^1R^2NCH_2$)phenyl. In some instances, diboronic acids may also be considered, such as 1, 4- and 1, 3-benzenediboronic acids.

Particular examples of boronic acids include phenylboronic acid (CAS 98-80-6, MW 121.93 g/mol), 4-fluorophenylboronic acid (CAS 1765-93-1, MW 139.92 g/mol), 3,4-difluorophenylboronic acid (CAS 168267-41-2, MW 157.91 g/mol), 3,4,5-trifluorophenylboronic acid (CAS 143418-49-9, MW 175.9 g/mol), n-butylboronic acid (CAS 4426-47-5, MW 101.94 g/mol), 2-thienylboronic acid (CAS 6165-68-0, MW 127.96 g/mol), 1,4-phenylenediboronic acid (CAS 4612-26-4, MW 165.75 g/mol) and mixtures thereof.

Particular examples of borinic acids include bis(pentafluorophenyl)borinic acid (CAS Number 2118-02-7, MW 361.93 g/mol), diphenylborinic acid, dimesitylborinic acid, Bis(3,4-dimethylphenyl)borinic acid, borinic Acid, B,B-Bis (2,3,4,5,6-pentafluorophenyl).

Methods to obtain boronic and borinic acids are well known in the art and will not be discussed here.

Each boric acid derivative, e.g., boronic acids and/or borinic acids typically has a molecular weight of from 90 to 600 g/mol, alternatively of from 90 to 400 g/mol, alternatively of from 90 to 250 g/mol.

It is believed existing boric acid based handling additives do not benefit from the presence of the boric acid derivatives identified above. In the case of boronic acids, for example, those of molecular weight of from 90 to 250 g/mol, are typically provided as a powder, which may be handled in air without special precautions. At ambient temperature, boronic acids are chemically stable. They do not tend to dis-proportionate into their corresponding borinic acid and boric acid even at high temperatures. Boronic acids are not believed to present no particular environmental or health threat.

The silicone polymer present in the handling additive composition may be a silicone fluid or a silicone gum, and mixtures thereof. They may or may not contain groups which will participate in the cure process of the silicone rubber base/stock composition to which the handling additive is introduced to make a silicone rubber elastomeric product e.g., unsaturated groups such as alkenyl groups and alkynyl groups.

Typical silicone polymer may generally be described as polymers having multiple units of the formula (I):

$$R_aSiO_{(4-a)/2} \quad (I)$$

in which R is independently selected from hydrogen, aliphatic hydrocarbyl, aromatic hydrocarbyl, or organyl group (that is any organic substituent group, regardless of functional type, having one free valence at a carbon atom). Saturated aliphatic hydrocarbyls are exemplified by, but not limited to alkyl groups such as methyl, ethyl, propyl, pentyl, octyl, undecyl, and octadecyl and cycloalkyl groups such as cyclohexyl. Unsaturated aliphatic hydrocarbyls are exemplified by, but not limited to, alkenyl groups such as vinyl, allyl, butenyl, pentenyl, cyclohexenyl and hexenyl; and by alkynyl groups. Aromatic hydrocarbon groups are exemplified by, but not limited to, phenyl, tolyl, xylyl, benzyl, styryl, and 2-phenylethyl. Organyl groups are exemplified by, but not limited to, halogenated alkyl groups such as chloromethyl, 3-chloropropyl, and 3,3,3-trifluoropropyl; nitrogen containing groups such as amino groups, amido groups, imino groups, imido groups; oxygen containing groups such as polyoxyalkylene groups, carbonyl groups, alkoxy groups and hydroxyl groups. Further organyl groups may include sulfur containing groups, fluoro containing groups, phosphorus containing groups, boron containing groups. The subscript "a" is 0, 1, 2 or 3.

Siloxy units may be described by a shorthand (abbreviated) nomenclature, namely—"M," "D," "T," and "Q", when R is a methyl group (further teaching on silicone nomenclature may be found in Walter Noll, Chemistry and Technology of Silicones, dated 1962, Chapter I, pages 1-9). The M unit corresponds to a siloxy unit where a=3, that is $R_3SiO_{1/2}$, the D unit corresponds to a siloxy unit where a=2, namely $R_2SiO_{2/2}$, the T unit corresponds to a siloxy unit where a=1, namely $R_1SiO_{3/2}$; the Q unit corresponds to a siloxy unit where a=0, namely $SiO_{4/2}$.

Examples of typical functional groups on the silicone polymer include hydroxyl; alkoxyl; alkenyl, such as vinyl; alkyl such as methyl, or alkyl chains up to 8 carbon atoms; aryl, such as phenyl. The functional group may be in pendent position (on a D or T siloxy unit), or may be terminal (on an M siloxy unit).

The silicone polymer which may be suitable in the frame of the present invention may have a number average molecular weight of from 100-700,000. Number average molecular weight ($M_n$) and the weight average molecular weight (Mw) values of silicone can be determined by Gel permeation chromatography (GPC). This technique is standard and yields Mw (weight average molecular weight), Mn (number average molecular weight) and the polydispersity index (PI). DP=Mn/Mu where Mn is the number-average molecular weight coming from the GPC measurement and Mu is the molecular weight of a monomer unit. PI=Mw/Mn. Weight average molecular weight (Mw) is often utilised to define the content of silicone gums.

The silicone polymer may be a combination of more than 1 polymer, such as a silicone gum and a low number average molecular weight fluid such as silanol terminated dimethylsiloxane fluid with an average number average molecular weight ranging from 250-3000 determined by Gel permeation chromatography (GPC).

The silicone polymer which may be suitable in the frame of the present invention may have a viscosity of from 0.65 mPa·s to more than 10,000 Pa·s at 25° C. Typically a gum is a silicone polymer having a viscosity of at least 1,000,000 mPa·s at 25° C. However, because of the difficulty in measuring viscosity above these values, gums tend to be described by way of their Williams plasticity values in accordance with ASTM D-926-08 as opposed to by viscosity. The silicone polymer may be a combination of a silicone gum and a low viscosity fluid, such as a dimethylpolysiloxane having a viscosity of 30-70 mPa·s at 25° C. measured using ASTM D 1084-16 Method B (for cup/spindle) with the most appropriate spindle for the viscosity concerned. All viscosity measurements are given at 25° C. unless otherwise indicated. Viscosity values given were made using ASTM D 1084-16 Method B (for cup/spindle) for viscosities below 100,000 mPa·s. Viscosities above about 100,000 mPa·s viscosity are determined using ASTM D 4287-00(2014) (cone/plate) at a 10 $S^{-1}$ shear speed unless otherwise indicated.

The silicone polymer may be selected from polydimethylsiloxanes, alkylmethylpolysiloxanes, alkylarylpolysiloxanes, hydroxyl functional siloxanes, alkoxy functional siloxanes and mixtures thereof. They may be linear or branched or cyclic but typically will be linear or branched. The polysiloxanes may have any suitable terminal groups, for example, they may be trialkyl terminated, alkenyldialkyl terminated, hydroxydialkyl terminated, alkoxydialkyl terminated or may be terminated with any other suitable terminal group combination.

The silicone polymer may further be selected from polydimethylsiloxanes, alkylmethylpolysiloxanes, alkylarylpolysiloxanes, hydroxyl functional siloxanes, and mixtures thereof.

Examples of the powder optionally present in the handling additive composition as described herein include polytetrafluoroethylene, fumed silica, carbon black, carbon nanotube, multi-walled carbon nanotube, carbon fibre, graphene, nano diamond, nano clay, graphite, polysaccharide nano compound, nano cellulose, cellulose nano whisker, layered silicate, boehmite, hydroxyapatite fillers, reinforcing fibres such as nylon, polyethylene, polyamide, glass fibres, and mixtures thereof.

Particular examples of powder include polytetrafluoroethylene, fumed silica, carbon black, carbon nanotube, multi-walled carbon nanotube, carbon fibre, graphene, nano diamond, nano clay, graphite, and mixtures thereof.

The optional powder may have a particle size of from 0.01 to 10000 μm, alternatively of from 0.01 to 5000 μm, alternatively of from 0.01 to 1000 μm, alternatively of from 0.01 to 300 μm which may be measured by means of laser light scattering (e.g., according to ASTM D4464-15).

The optional powder in the handling additive composition may be the same or different as the various fillers discussed in the silicone elastomer base discussed below. In some instances, the optional powder is different from the various fillers discussed in the silicone elastomer base discussed below.

The present handling additive composition comprises
  at least one boric acid derivative, selected from borinic acids, boronic acids and mixtures thereof, in an amount of from 5.0 to 50.0% wt.,
  a silicone polymer in an amount of from 50.0 to 95.0% wt., an optional powder in an amount of from 0.0 to 30.0% wt.
The total amount of the three ingredients being 100% wt. in any composition of the handling additive.

The present invention provides for a process to produce the handling additive composition comprising the steps of:
1) providing for all ingredients;
2) mixing them in any order.

The handling additive composition may be produced by mixing the ingredients together at room temperature to form a homogeneous consistency product. The shearing necessary to accomplish this may take place in such equipment as a dough mixer, a 2 roll mill, a three roll mill, or a compounding extruder. If the amount of boric acid derivative(s) as described above is/are such that the boric acid derivative(s) is/are completely soluble, the resulting single phase only needs to be uniformly distributed with the filler. In other instances, it may be necessary to use a high shear mixer such as 3 roll mill in order to obtain a homogeneous blend.

The handling additive composition should have a viscosity high enough to prevent separation of the ingredients during storage prior to use. The viscosity should not be so high that it is difficult to disperse the handling additive composition in the silicone elastomer base. The viscosity of the composition may change during storage but it is not critical as long as the composition can be properly dispersed when it is used.

The present invention further provides for a modified silicone elastomer base composition comprising at least one silicone elastomer base and the present handling additive composition.

The handling additive composition may be used to improve the handling properties of the common commercial silicone elastomer bases presently available. Such bases comprise polydiorganosiloxane of gum consistency, reinforcing filler and optionally an anti-crepe aging material as well as other optional assorted ingredients to modify such properties as heat aging, compression set, fluid resistance, flame resistance, and colour of the resulting cured silicone elastomeric material.

A first typical silicone elastomer base may comprise:
  an organopolysiloxane containing at least 2 alkenyl groups bonded to silicon atom per molecule, alternatively at least 3 alkenyl groups bonded to silicon atom per molecule, or a mixture of different types of organopolysiloxanes containing at least 2 alkenyl groups bonded to silicon atom per molecule, alternatively at least 3 alkenyl groups bonded to silicon atom per molecule;
  a reinforcing filler;
  optional ingredients.

The organopolysiloxane may be a linear, branched or resinous polymer.

Examples of alkenyl groups present on the organopolysiloxane include vinyl, allyl, butenyl, pentenyl, cyclohexenyl and hexenyl groups. These may be pendent or terminal or at both positions, that is, they may be present on any of the siloxy units of the organopolysiloxane.

The viscosity of the organopolysiloxane at 25° C. is typically >1000 Pa·s measured in accordance with ASTM D 1084-16 Method B (for cup/spindle) using the most appropriate spindle.

The organopolysiloxane may contain other functional groups such as phenyl groups or trifluoropropyl groups.

The organopolysiloxane may be a mixture of two or more organopolysiloxanes containing at least 2 alkenyl groups bonded to silicon atom per molecule, alternatively at least 3 alkenyl groups bonded to silicon atom per molecule.

Examples of organopolysiloxanes include vinyldimethylsiloxy-endblocked dimethylsiloxane-vinylmethylsiloxane copolymer, vinyldimethylsiloxy-endblocked polydimethylsiloxane, vinylmethylhydroxysiloxy-endblocked dimethylsiloxane-vinylmethylsiloxane copolymer, and mixtures thereof.

The reinforcing filler may be a silica, having a specific surface area measured by BET method of from 50 $m^2/g$ up to 450 $m^2/g$. Examples of silica filler include precipitated silica (wet silica), fumed silica (dry silica), calcined silica, and the like. The silica filler may be surface-treated, hydrophilic or hydrophobic. The silica may contain alkenyl group on its surface.

Any suitable anti-creping agent may be utilised when present in the base as hereinbefore described. Anti-creping agents may include any suitable fluid which can be used to treat the filler to increase its hydrophobicity, such as octamethylcyclotetrasiloxane, trimethylsilyl terminated polydiorganosiloxane fluids with a viscosity of between 25 to 500 mPa·s at 25° C. measured using ASTM D 1084-16 Method B (for cup/spindle) with the most appropriate spindle, dimethylhydroxysilyl terminated polydiorganosiloxane fluids with a viscosity of between 25 to 500 mPa·s at 25° C. measured using ASTM D 1084-16 Method B (for cup/spindle) and the most appropriate spindle.

Additives may be present in the silicone base composition or in the curable silicone elastomer stock composition depending on the intended use of the composition. Examples of additives include electrical conductive fillers, thermally conductive fillers, non-conductive filler different from silica filler, pot life extenders, rheological additives, flame retardants, pigments, lubricants, adhesion promoters, mold release agents, diluents, solvents, UV light stabilizers, bactericides, wetting agent, heat stabilizer, compression set additive, plasticizer, etc.

Examples of electrical conductive fillers include metal particles, metal oxide particles, metal-coated metallic particles (such as silver plated nickel), metal coated non-metallic core particles (such as silver coated talc, or mica or quartz) and a combination thereof. Metal particles may be in the form of powder, flakes or filaments, and mixtures or derivatives thereof.

Examples of thermally conductive fillers include boron nitride, alumina, metal oxides (such as zinc oxide, magnesium oxide and aluminium oxide), graphite, diamond and mixtures or derivatives thereof.

Examples of a lubricant may be selected from phenyl functional siloxanes (such as dimethylmethylphenyl siloxane, diphenyl siloxane), and others like propylene glycol.

Examples of non-conductive fillers include quartz powder, diatomaceous earth, talc, clay, calcium carbonate, magnesium carbonate, hollow glass, glass fibre, hollow resin and plated powder, and mixtures or derivatives thereof. The present composition may be free of calcined kaolin filler and/or quartz powder.

Examples of pot life extenders include triazole.

Examples of rheological additives include alkenyl functional silicone resin.

Examples of flame retardants include aluminium trihydrate, chlorinated paraffins, hexabromocyclododecane, triphenyl phosphate, dimethyl methylphosphonate, tris(2,3-dibromopropyl) phosphate (brominated tris), and mixtures or derivatives thereof.

Examples of pigments include iron oxides, carbon black, and mixtures or derivatives thereof.

Examples of lubricants include polytetrafluoroethylene (PTFE), resin powder, graphite, fluorinated graphite, talc, boron nitride, fluorine oil, silicone oil, phenyl silicone oil, molybdenum disulfide, and mixtures or derivatives thereof.

Examples of adhesion promoters include silane coupling agents.

Examples of heat stabilizer include cerium hydrate, titanium dioxide, barium zirconate, iron oxide.

The handling additive composition may be used to improve the handling properties of the common commercial silicone elastomer stock compositions comprising the aforementioned silicone bases mixed with a suitable catalyst/curing package. Such stock compositions comprise the bases as described above together with said catalyst and or cure package prior to cure of the composition into an elastomer.

A first typical silicone elastomer stock composition may comprise a base as herein before described together with a peroxide or mixtures of different types of peroxides.

The peroxide may be any of the well-known commercial peroxides used to vulcanize silicone elastomer compositions. The amount of organic peroxide used is determined by the nature of the curing process, the organic peroxide used, and the silicone elastomer base used. These considerations are well-known to those skilled in the art of silicone elastomers.

Typical organic peroxides are 2,4-dichlorobenzoyl peroxide, benzoyl peroxide, ditertiarybutyl peroxide, dicumyl peroxide, and 2,5-bis(tert-butyl peroxy)-2,5-dimethylhexane.

A second typical silicone elastomer stock composition may comprise:
 a base as herein before described together with an organohydrogen polysiloxane containing at least two, alternatively at least 3 silicon bonded hydrogen atoms, and a hydrosilylation catalyst.

The organohydrogenpolysiloxane operates as a crosslinker for curing the organopolysiloxane containing at least 2 alkenyl groups, by the addition reaction of the silicon-bonded hydrogen atoms with the alkenyl groups under the activity of the hydrosilylation catalyst.

Examples of organohydrogenpolysiloxane include but are not limited to:
(i) trimethylsiloxy-terminated methylhydrogenpolysiloxane,
(ii) trimethylsiloxy-terminated polydimethylsiloxane-methylhydrogensiloxane,
(iii) dimethylhydrogensiloxy-terminated dimethylsiloxane-methylhydrogensiloxane copolymers,
(iv) dimethylsiloxane-methylhydrogensiloxane cyclic copolymers,
(v) copolymers composed of $(CH_3)_2HSiO_{1/2}$ units and $SiO_{4/2}$ units, and
(vi) copolymers composed of $(CH_3)_3SiO_{1/2}$ units, $(CH_3)_2HSiO_{1/2}$ units, and $SiO_{4/2}$ units.

The hydrosilylation catalyst may be a metal selected from the platinum metals, i.e., platinum, ruthenium, osmium, rhodium, iridium and palladium, or a compound of such metals. The metals include platinum, palladium, and rhodium but platinum and platinum compounds are preferred due to the high activity level of these catalysts in hydrosilylation reaction.

Example of typical hydrosilylation catalysts include but are not limited to platinum black, platinum on various solid supports, chloroplatinic acids, alcohol solutions of chloroplatinic acid, and complexes of chloroplatinic acid with liquid ethylenically unsaturated compounds such as olefins and organosiloxanes containing ethylenically unsaturated silicon-bonded hydrocarbon radicals. Complexes of chloroplatinic acid with organosiloxanes containing ethylenically unsaturated hydrocarbon radicals are described in U.S. Pat. No. 3,419,593.

Further ingredients may be any or more of these discussed above for the first typical silicone elastomer base.

The composition of the handling additive as described herein improves the handling qualities of silicone elastomer bases and silicone elastomer stock compositions in which it is dispersed in two ways. The viscosity of the base/stock composition is raised giving a material that is easier to handle in that the resulting modified base or stock composition has more "body" and less tendency to stretch and flow during handling operations. However because of the high viscosity of the modified base or stock composition the measurement typically used to show this is Williams plasticity (measured in accordance with ASTM D-926-08) as detailed in the following examples. The surface "tack" or stickiness of the base/stock composition is reduced, thus reducing the tendency of the base/stock composition to stick to surfaces such as containers, process rolls, extruder dies, etc. during processing and handling.

The process for introducing the handling agent into a base or curable stock composition as described herein comprises shearing the previously described handling agent and a silicone elastomer base together to produce a modified base composition or stock composition that has improved handling properties. The shearing is normally done on a two roll rubber mill which is also used to convert the base into a curable stock composition ready for curing by adding organic peroxide vulcanizing agent or a hydrosilylation cure package of Si—H containing organopolysiloxane and Pt group catalyst and modifiers such as flame retardant additives and coloring pigments. The handling agent composition hereinbefore described can be added at any time during the process of mixing the above ingredients as long as it is thoroughly dispersed throughout the base and/or stock composition. It is desirable to add the handling agent prior to the catalyst/cure package and other additives (when present) as it will then be easier to add the remaining ingredients because of the improved handling of the material being mixed.

There is provided herein a process for introduce a handling agent as hereinbefore described into a silicone elastomer base composition to make a modified silicone elastomer base composition, comprising at least the steps of:
 (i) providing at least one silicone elastomer base; and
 (ii) adding to it the handling additive composition; and
 (iii) mixing.

There is also provided herein a process for providing a curable silicone elastomer stock composition comprising the above process to make a modified silicone elastomer base composition together with the additional step of:
 (iv) introducing a catalyst/cure package into the base before, subsequent to or during step (ii) and where appropriate mixing in addition to step (iii).

The mixing may be done in any suitable mixing means, such as a three-roll mill, a sigma blade mixer, a bread dough mixer, and a two-roll mill, at temperatures below the curing temperature, that is, typically <50° C.

The modified silicone elastomer base may comprise only some of its final ingredients. That is, the silicone elastomer base may comprise the organopolysiloxane containing at least 2 alkenyl groups bonded to silicon atom per molecule, reinforcing filler, and one or more of additional ingredients, such as pigments and the like when the handling agent is introduced. Preferably the reinforcing filler will have been pre-treated to render it hydrophobic or is treated in situ with anti-creping agent as this will make it easier to mix into the polymer.

The handling additive composition may be added at any time during the process of finalizing the silicone elastomer stock composition as long as it is thoroughly dispersed during the remainder of the process. It is desirable to add the handling additive composition into a base before other (optional) ingredients and the catalyst/cure package as it will then be easier to add the remaining ingredients because of the improved handling of the material being mixed. It may also be suitable to add the handling additive composition before the peroxide is added to the silicone elastomer base, or into the polymer alone before the reinforcing filler is added.

The silicone elastomer base may typically have a viscosity resulting in a Williams plasticity of at least 50 mm/100 measured in accordance with ASTM D-926-08. Lower viscosity bases are normally mixed on different types of equipment and do not need the type of handing improvement imparted by this process.

The amount of handling additive composition in the silicone elastomer base composition or silicone elastomer stock composition may be from 0.05 to 10% wt., alternatively, from 0.1 to 5 wt. % by weight of silicone elastomer base composition/silicone elastomer stock composition, alternatively of from 0.1 to 2 wt. % by weight of silicone elastomer base composition/silicone elastomer stock composition, alternatively of from 0.1 to 1 wt. % by weight of silicone elastomer base composition/silicone elastomer stock composition.

The resulting composition may be processed by injection moulding, encapsulation moulding, press moulding, extrusion, transfer moulding, press vulcanization, calendering, or blow moulding.

The curable silicone elastomer stock composition containing a peroxide catalyst is cured by heating to a temperature above the activation temperature of the organic peroxide catalyst chosen for a period of time sufficient to vulcanize the stock to the point desired. Before heating, the stock may be formed into the desired shape by the common steps of molding, extruding, calendering, or other such forming operation. Such steps and procedures are well-known in the art.

Curing can for example take place in a mold to form a moulded silicone article. The composition may for example be injection moulded to form an article, or the composition can be overmoulded by injection moulding around an article or over a substrate.

In one embodiment, the present invention relates to an article cured from the curable silicone elastomer stock composition. Such articles include those that may be used in thin-walled membranes, switch covers, spark-plug connectors, electrical insulators, single-wire seals, plug connector seals, automobile components such as connector seal and spark plug boots, electric and electronic parts such as rolls in a copying machine.

The cured article obtained from curing the silicone elastomer composition of the present invention may provide for composite parts where mechanical bonding to a substrate occurs.

The substrate may be rigid or flexible. Examples of substrates include plastic substrates, thermoplastic substrates, metal substrates, and textile substrates.

The present handling additive composition is found to advantages of the may be retrieved in the silicone elastomer containing them.

The present invention also provides for the use of a boric acid derivative as described above in a handling additive composition for silicone elastomer compositions. As previously discussed, the boric acid derivatives are selected from borinic acids, boronic acids and mixtures thereof. Suitable specific examples include but are not limited to phenylboronic acid, 4-fluorophenylboronic acid, 3,4-difluorophenylboronic acid, 3,4,5-trifluorophenylboronic acid, n-butylboronic acid, 2-thienylboronic acid, 1,4-phenylenediboronic acid, bis(pentafluorophenyl)borinic acid, diphenylborinic acid, dimesitylborinic acid, Bis(3,4-dimethylphenyl)borinic acid, borinic Acid, B,B-Bis(2,3,4,5,6-pentafluorophenyl) and mixtures thereof.

EXAMPLES

All plasticity measurements are Williams Plasticity measurements in accordance with ASTM D-926-08 unless otherwise indicated. All measurements with regard to Williams plasticity were undertaken on uncatalysed silicone rubber base compositions or modified silicone rubber base compositions containing the handling additive.

Rubber Bases

Rubber base 1—low durometer, (30 Shore A) contains silicone gum, OH-terminated silicone fluid, silica.

Rubber base 2—high durometer (70 Shore A), contains silicone gum, OH-terminated silicone fluid, silica in an increased amount over Rubber base 1.

Rubber base 3: 70 Shore A silicone rubber base for bond strength testing of Turbo charge hose (TCH).

Boric Acid Derivatives

Phenylboronic acid CAS #98-80-6

4-Fluorophenylboronic acid CAS #1765-93-1

3,4-Difluorophenylboronic acid CAS #168267-41-2

3,4,5-Trifluorophenylboronic acid CAS #143418-49-9 n-Butylboronic acid CAS #4426-47-5

Tributyl borate CAS #688-74-4

2-Thienylboronic acid CAS #6165-68-0

1,4-Phenylenediboronic acid CAS #4612-26-4

Unless otherwise indicated, the amounts of bases and handling additives are indicated in % weight and viscosity measurements were taken at 25° C., using Viscosity values given were made using ASTM D 1084-16 Method B (for cup/spindle) for viscosities below 100,000 mPa·s. Viscosities above 100,000 mPa·s viscosity are determined using ASTM D 4287-00(2014) (cone/plate) at a 10 S shear speed unless otherwise indicated.

The handling additive compositions and a comparative handling additive composition were made by mixing the ingredients indicated in Table 1 below, in a kneader mixer. The boric acid derivative was a borinic acid or a boronic acid as identified in the list above.

The handling additive composition may be combined with the rubber base using a two roll mill or kneader mixer.

TABLE 1

| Ingredient | Comparative handling additive composition (% wt.) | Handling additive composition according to the invention (% wt.) |
|---|---|---|
| Silicone gum having a Mw of approximately 500,000 (GPC) | 23.80 | |
| Silicone fluid of 30000 mPa · s | 23.80 | 23.80 |
| PTFE powder | 23.80 | 23.80 |
| Silicone fluid of viscosity of 50 mPa · s | 4.80 | 4.40 |
| Boric acid | 23.80 | — |
| Boric acid derivative | — | 48.00 |
| Total dosage | 100.00 | 100.00 |

A reference example and comparative example 1 were prepared. The reference example was 100% of rubber base 1 and Comparative Example 1 comprised 0.2% by weight of the comparative handling additive composition depicted in Table 1 above. Comparative examples 1 and 2 were prepared as indicated in Table 2 below. The Williams Plasticity of the Reference and Comparative 1 base compositions was measured periodically as indicated over a 7 day period in accordance with ASTM D-926-08.

TABLE 2

| | Reference Example 1 | Comparative example 1 |
|---|---|---|
| Rubber base 1 | 100% | 99.8% |
| Boric acid | None (Blank sample) | 0.2% comparative handling additive composition containing boric acid |
| Plasticity (mm/100) | | |
| Initial | 156 | 169 |
| 1 day | 157 | 221 |
| 3 days | 162 | 240 |
| 7 days | 170 | 244 |
| Plasticity increase? | | Yes |
| CAS# | | 10043-35-3 |

It can be seen that compared to the Reference example, comparative example 1 showed a significant increase in Williams Plasticity due largely to the presence of the boric acid which we are seeking to replace as hereinbefore described. It was also noted that where plasticity results increased, tackiness decreased.

Examples 1 to 6: Boric Acid Derivatives in Rubber Base 1—Low Duro—Table 3

Examples 1 to 6 compare six handling additive compositions (HA), each containing a different boric acid derivative. The handling additive compositions were incorporated into the silicone rubber base 1 in varying amounts, as outlined in Table 2. The selected boric acid derivative chosen for use in each of Examples 1 to 6 is also indicated in Table 2. Again the Williams Plasticity values were determined periodically over a 7 day period in accordance with ASTM D-926-08 as can be seen in Table 3 below.

TABLE 3

| | Example 1 | Example 2 | Example 3 | Example 4 | Example 5 | Example 6 |
|---|---|---|---|---|---|---|
| Rubber base 1 (wt. %) | 99.5% | 99.5% | 99.5% | 99.5% | 99.5% | 99.01% |
| Amount of HA (wt. %) | 0.5% | 0.5% | 0.5% | 0.5% | 0.5% | 0.99% |
| Boric acid derivative in HA | Phenylboronic acid | 4-Fluorophenylboronic acid | 3,4-Difluorophenylboronic acid | 3,4,5-Trifluorophenylboronic acid | n-Butylboronic acid | Tributyl borate |
| Plasticity (mm/100) | | | | | | |
| Initial | 230 | 205 | 225 | 223 | 223 | 235 |
| 1 day | 218 | 215 | 222 | 202 | 224 | 259 |
| 3 days | 215 | 226 | 224 | 209 | 220 | 258 |
| 7 days | 215 | 214 | 217 | 202 | 215 | 255 |
| Plasticity increase vs Reference Example? | Yes | Yes | Yes | Yes | Yes | Yes |
| CAS# | 98-80-6 | 1765-93-1 | 168267-41-2 | 143418-49-9 | 4426-47-5 | 688-74-4 |

Williams Plasticity is overall increased when compared to the Reference Example, corresponding to the neat Rubber base 1.

Comparative Examples 2 to 5: Rubber Base 1—Low Duro—Table 4

Comparative examples 2 to 5 review alternative handling additives, which do not increase plasticity, such as pentaerythritol, FKM gum of 25 Mooney Units (MU) viscosity, FKM gum of 10 MU viscosity and PTFE.

TABLE 4

|  | Comparative example 2 | Comparative example 3 | Comparative example 4 | Comparative example 5 |
|---|---|---|---|---|
| Rubber base 1 | 99.01% | 99.01% | 99.01% | 99.01% |
| Alternative Handling Additive | 0.99% Pentaerythritol | 0.99% 2605 (FKM gum, 25 MU viscosity) | 0.99% A-100 (FKM gum, 10 MU viscosity) | 0.99% MP1000 (~10 um PTFE) |
| Plasticity (mm/100) | | | | |
| Initial |  | 156 | 156 | 154 |
| 1 day |  |  |  |  |
| 3 days |  |  | 162 | 159 |
| 7 days | 160 | 160 | 167 | 162 |

TABLE 4-continued

|  | Comparative example 2 | Comparative example 3 | Comparative example 4 | Comparative example 5 |
|---|---|---|---|---|
| Plasticity increase vs Reference Example? | Almost no | Almost no | Almost no | Almost no |

It can be seen that none of these handling compositions have as good an effect as the examples in accordance with the above.

Reference Example 2 is the Rubber base 2 without any handling additive. Comparative example 6 contains 0.1% of Boric acid. Plasticity is increased over the Comparative example 6.

TABLE 5

|  | Reference Example 2 | Comparative example 6 |
|---|---|---|
| Rubber base 2 | 100% | 99.9% |
| Boric acid (BA) | Blank sample | 0.1% Boric acid |
| Plasticity (mm/100) | | |
| Initial | 375 | 391 |
| 1 day | 386 | 743 |
| 3 days | 396 | 855 |
| 7 days | 422 | 865 |
| Plasticity increase? |  | Yes |
| CAS# |  | 10043-35-3 |

Examples 7 to 11: Boric Acid Derivatives in Rubber Base 2—High Duro—Table 6

Examples 7 to 11 review 5 different boric acid derivatives used at various amounts in Rubber base 2, as outlined in Table 6.

TABLE 6

|  | Example 7 | Example 8 | Example 9 | Example 10 | Example 11 |
|---|---|---|---|---|---|
| Rubber base 2 | 99.8% | 99.8% | 99.8% | 99.8% | 99.8% |
| Boric acid(BA) alternatives | 0.2% Phenylboronic acid | 0.2% 3,4,5-Trifluorophenylboronic acid | 0.2% n-Butylboronic acid | 0.2% 2-Thienylboronic acid | 0.2% 1,4-Phenylenediboronic acid |
| Plasticity (mm/100) | | | | | |
| Initial | 582 | 448 | 612 | 628 | 518 |
| 1 day | 800 | 750 | 643 | 682 | 748 |
| 3 days | 812 | 820 | 708 | 708 | 825 |
| 7 days | 855 | 830 | 765 | 727 | 829 |
| Plasticity increase? | Yes | Yes | Yes | Yes | Yes |
| CAS# | 98-80-6 | 143418-49-9 | 4426-47-5 | 6165-68-0 | 4612-26-4 |

Plasticity is overall increased when compared to Reference example 2, corresponding to the neat Rubber base 2. Plasticity increase is higher than for Comparative example 8 based on boric acid.

Comparative Examples 7 to 11: Rubber Base 2—High Duro—Table 7

Comparative examples 9 to 11 review alternative handling additives, which do not increase plasticity, such as FKM gum of 25 MU viscosity, FKM gum of 175 MU viscosity, PTFE.

TABLE 7

|  | Comparative example 7 | Comparative example 8 | Comparative example 9 |
|---|---|---|---|
| Rubber base 2 | 99.01% | 99.01% | 99.01% |
| Alternative Handling Additive | 0.99% 2605 (FKM gum, 25 MU viscosity) | 0.99% 2602-3 (FKM gum, 175 MU viscosity) | 0.99% MP 1000 (~10 um PTFE) |
| Plasticity (mm/100) | | | |
| Initial | 375 | 375 | 370 |
| 1 day | 419 | 387 | 378 |
| 3 days | 480 | 409 | 415 |
| 7 days | 545 | 426 | 415 |
| Plasticity increase? | A little increase | Almost no | Almost no |

Example 12 and Comparative Example 10: Bonding Strength

Example 12 is uses silicone rubber base 3 containing 0.4% phenylboronic acid (from a handling additive composition comprising 48% wt phenylboronic acid among other ingredients), set to bond with a commercial fluorosilicone rubber base. Bonding strength was measured at 0.67 N/mm (HCR/FSR). Test method: Sample prepared in Example 12 and Comparative example 10 were subjected to a 180° peel test using an Inston tensiometer at a crosshead speed of 50 mm/min.

Comparative example 10 uses silicone rubber base 3 containing 0.2% Boric acid (from a comparative handling additive composition comprising 23.8% wt Boric acid among other ingredients), set to bond with a commercial fluorosilicone rubber base. Bonding strength was measured using the same test method as described above at 0.71 N/mm (HCR/FSR).

This test indicates bonding strength is equivalent for the handling additive composition according to the invention, as compared to handling additive composition containing boric acid.

The invention claimed is:

1. A modified silicone elastomer base composition comprising:
   I) at least one silicone elastomer base; and
   II) a handling additive composition comprising:
      at least one boric acid derivative selected from the group consisting of borinic acids, boronic acids, and mixtures thereof;
      a silicone polymer; and
      optionally, a powder.

2. The modified silicone elastomer base composition of claim 1, wherein the boric acid derivative is selected from the group consisting of phenylboronic acid, 4-fluorophenylboronic acid, 3,4-difluorophenylboronic acid, 3,4,5-trifluorophenylboronic acid, n-butylboronic acid, 2-thienylboronic acid, 1,4-phenylenediboronic acid, bis(pentafluorophenyl)borinic acid, diphenylborinic acid, dimesitylborinic acid, Bis(3,4-dimethylphenyl)borinic acid, borinic Acid, B,B-Bis (2,3,4,5,6-pentafluorophenyl), and mixtures thereof.

3. The modified silicone elastomer base composition of claim 1, wherein the silicone polymer is selected from the group consisting of polydimethylsiloxanes, alkylmethylpolysiloxanes, alkylarylpolysiloxanes, hydroxyfunctional siloxanes, alkoxyfunctional siloxanes, and mixtures thereof.

4. The modified silicone elastomer base composition of claim 1, wherein the powder is present in the handling additive composition and selected from the group consisting of polytetrafluoroethylene, fumed silica, carbon black, carbon nanotubes, multiwalled carbon nanotubes, carbon fibres, graphene, nano diamond, nano clay, graphite, polysaccharide nano compounds, nano cellulose, cellulose nano whiskers, layered silicates, boehmite, hydroxyapatite fillers, reinforcing fibres, nylon, polyethylene, polyamide, glass fibres, and mixtures thereof.

5. The modified silicone elastomer base composition of claim 1, the handling additive composition comprising:
   5 to 50 wt. % of the boric acid derivative;
   50 to 95 wt. % of the silicone polymer; and
   0 to 30 wt. % of the powder.

6. A process for providing the modified silicone elastomer base composition in accordance with claim 1, the process comprising the steps of:
   (i) providing at least one silicone elastomer base;
   (ii) adding the handling additive composition to the silicone elastomer base; and
   (iii) mixing the components of step (ii).

7. The modified silicone elastomer base composition of claim 1, wherein the silicone elastomer base comprises at least one organopolysiloxane having at least 2 silicon-atom bonded alkenyl groups per molecule.

8. The modified silicone elastomer base composition of claim 1, wherein the handling additive composition is present in an amount of from 0.01 wt. % to 10 wt. % of the total weight of the modified silicone elastomer base composition.

9. A curable silicone elastomer stock composition comprising:
   the modified silicone elastomer base in accordance with claim 1; and
   a peroxide catalyst or a cure package.

10. The process of claim 6, wherein before step (ii), the process comprises the steps of:
    1) providing the boric acid derivative, the silicone polymer, and optionally the powder; and
    2) mixing the components to produce the handling additive composition.

11. The process of claim 6, further defined as a process for providing for a silicone elastomer stock composition, the process further comprising the step of:
    (iv) adding a catalyst or a cure package to the silicone elastomer base before, subsequent to or during step (ii).

12. An article or a composite part cured from the curable silicone elastomer stock composition of claim 9.

13. The article or composite part in accordance with claim 12, selected from the group consisting of thin-walled membranes, switch covers, spark-plug connectors, electrical insulators, single-wire seals, plug connector seals, connector seals and spark plug boots, electric and electronic parts, turbocharge hoses, and rolls in a copying machine.

* * * * *